US006369642B1

(12) United States Patent
Zeng (10) Patent No.: US 6,369,642 B1
(45) Date of Patent: Apr. 9, 2002

(54) OUTPUT SWITCH FOR CHARGE PUMP RECONFIGURATION

(75) Inventor: Raymond W. Zeng, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/748,611

(22) Filed: Dec. 26, 2000

(51) Int. Cl.[7] .............................................. G05F 1/10
(52) U.S. Cl. ...................................................... 327/536
(58) Field of Search ................................ 327/530, 534, 327/535, 536

(56) References Cited

U.S. PATENT DOCUMENTS

| | | | | |
|---|---|---|---|---|
| 5,140,182 A | * | 8/1992 | Ichimura | 307/296.1 |
| 5,602,794 A | * | 2/1997 | Javanifard et al. | 365/226 |
| 5,732,039 A | * | 3/1998 | Javanifard et al. | 365/226 |
| 5,767,735 A | * | 6/1998 | Javanifard et al. | 327/536 |
| 5,909,141 A | * | 6/1999 | Tomishima | 327/536 |
| 6,208,198 B1 | * | 3/2001 | Lee | 327/536 |

* cited by examiner

Primary Examiner—Jeffrey Zweizig
(74) Attorney, Agent, or Firm—Blakely, Sokoloff, Taylor & Zafman LLP (57) ABSTRACT

An output switch circuit for a reconfigurable charge pump circuit. A charge pump circuit comprising a single series of charge pump stages connected serially can be dynamically reconfigured as two parallel charge pump circuits, by connecting a first output switch to the output of an interior stage, and connecting a second output switch to the output of the final stage, with the outputs of both switches coupled together. Controls in the first output switch can prevent unwanted current from flowing through the first output switch in the reverse direction due to the higher voltage being produced by the second output switch when the charge pump circuit is configured as a single series of charge pump stages.

23 Claims, 7 Drawing Sheets

OUTPUT SWITCH FOR CHARGE PUMP RECONFIGURATION

BACKGROUND OF THE INVENTION

1. Field of the Invention

The invention pertains generally to computer circuitry. In particular, it pertains to charge pump circuitry.

2. Description of the Related Art

A charge pump circuit provides an output voltage that is higher than its own supply voltage. Among other uses, charges pumps find application in flash memories to produce erase and program voltages, which are typically several times higher than the supply voltage for the remaining circuitry in the flash memory.

A typical charge pump "stage" is a circuit that provides an output voltage that is approximately equal to the sum of the stage's input voltage and supply voltage. Higher voltages can be obtained by cascading a series of stages, with the output of one stage feeding the input of the next stage. In this manner, the final output voltage of the circuit can be increased to the desired level simply by placing the required number of stages in series. By tapping into this series of stages at different points, various output voltages can be obtained from the same charge pump circuit. Alternately, tapping into this series of stages at different points can produce the same output voltage when the supply voltage is changed, permitting changes in Vcc without requiring a different charge pump circuit to produce the same high voltages.

Figure 1:
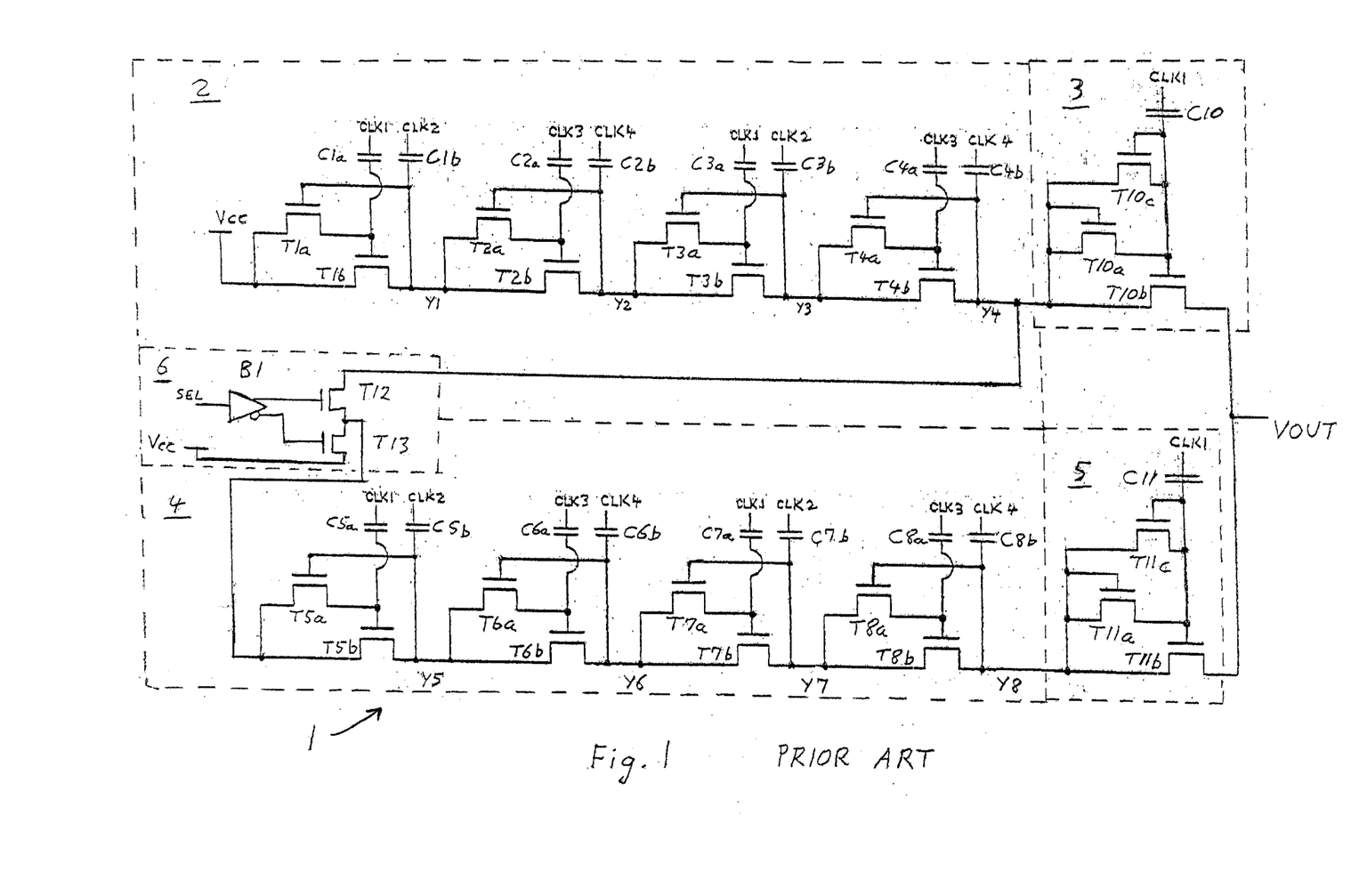
FIG. 1 shows a conventional reconfigurable charge pump circuit.

FIG. 1 shows a schematic of a reconfigurable charge pump circuit 1 that can be reconfigured from a single eight-stage charge pump circuit to a pair of parallel four-stage circuits. The first four stages form a first charge pump section 2, followed by an output circuit 3. The next four stages form a second charge pump section 4, followed by an output circuit 5. Switch circuit 6, shown as a level-shifter circuit, provides the ability to reconfigure from a single eight stage charge pump circuit to a pair of four-stage charge pump circuits in parallel by switching the input of the fifth stage between Y4 (for eight stages) and Vcc (for parallel four-stage sections). Depending on the polarity of select signal SEL, dual-output buffer B1 delivers a high signal to transistor T12 and a low signal to transistor T13, or vice-versa. This connects one of Y4 or Vcc to the input of the fifth stage, thus determining the starting voltage of the second section. This in turn determines whether the output of the second section will be the same as, or higher than, the output of the first section.

In a typical charge pump circuit, each stage has a switchable diode formed from two transistors Txa and Txb (where "x" is the stage number). Each stage also has two capacitors Cxa and Cxb, and produces an output voltage Yx. Output circuit regulates the output of the second section, permitting current to pass from Y8 to VOUT when CLK1 is high (turning on transistor T10b), and preventing current from flowing from VOUT back to Y8 when CLK1 is low (turning off transistor T10b). Output circuit 3 performs a similar function for Y4.

Figure 2:
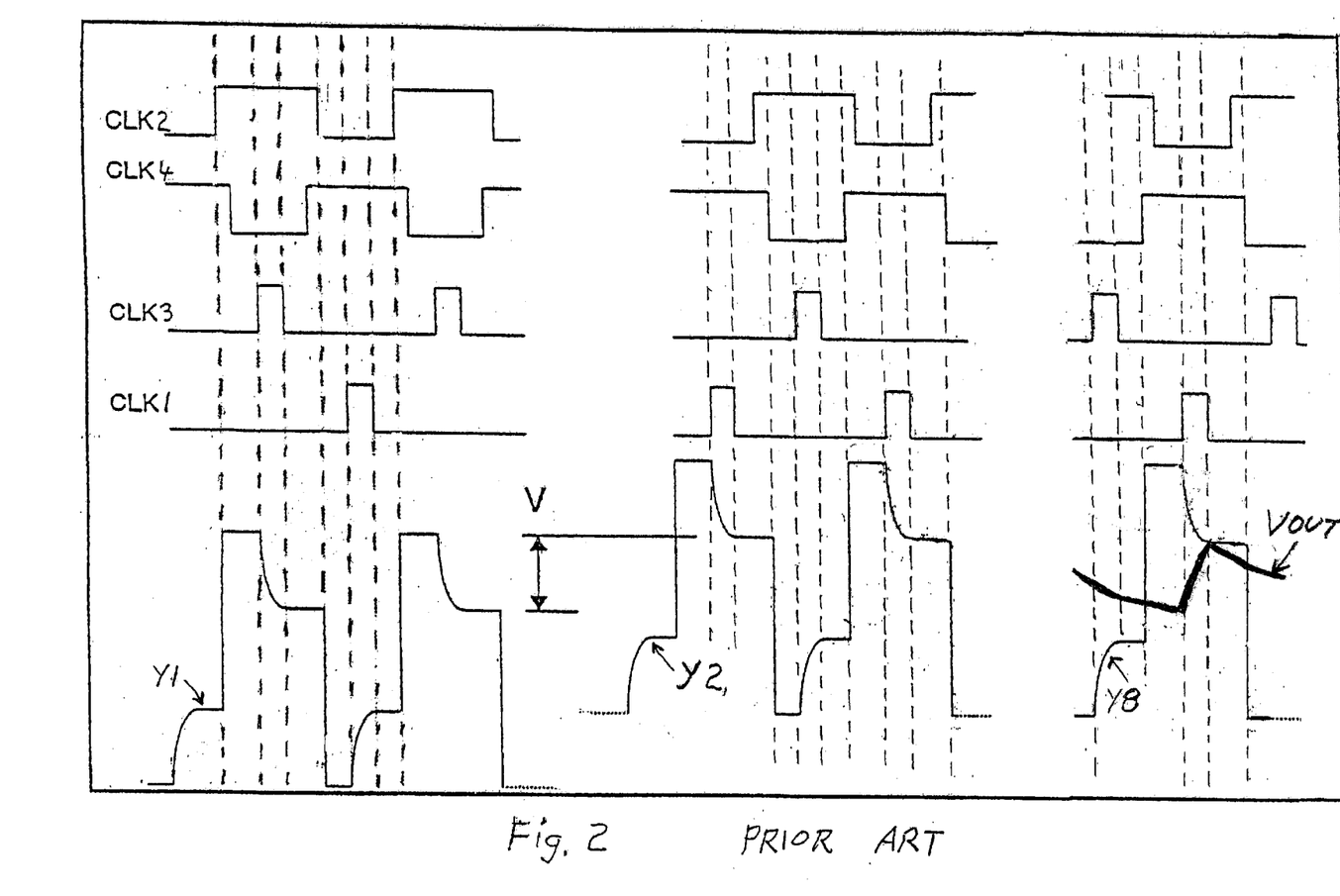
FIG. 2 shows a signal diagram for the circuit of FIG. 1.

FIG. 2 shows a timing diagram for some of the stages of FIG. 1, and can be extrapolated to explain the remaining stages. Each stage produces a similar waveform at Yx, but the voltage level at Yx is increased at each stage by an amount "V". The odd-numbered stage outputs Y1, Y3, Y5 and Y7 all have the same phase relationship to clock signals CLK1–4, while the even numbered stage outputs Y2, Y4, Y6 and Y8 are 180 degrees out of phase with the odd numbered stage outputs. The details of the operation of a charge pump stage are well known and are not further described here.

Output circuit 5 produces the waveform shown in FIG. 2 as VOUT, shown superimposed over the waveform at Y8. When the charge pump circuit 1 is configured as two parallel charge pump circuits, the voltage levels at Y4 and Y8 are virtually identical. When configured as a single eight-stage charge pump circuit, the voltage at Y8 is significantly higher than at Y4.

This arrangement works fairly well when configured as two parallel four-stage charge pump circuits. Since both Y4 and Y8 have the same waveform, phase, and voltage level, their respective currents can be summed at VOUT. However, when configured as a single eight-stage circuit, the voltage at Y8 (and therefore at VOUT) is considerably higher than at Y4. When CLK1 is low, transistor T10b is off, preventing any reverse current flow through it due to this voltage difference. But when CLK1 is high, transistor T10b is on, allowing current to flow in the reverse direction through transistor T10b from the higher voltage VOUT to the lower voltage Y4. This reverse current flow takes available current away from any output load that might be connected to VOUT, and can reduce the voltage level of VOUT by diverting some of the current from output circuit 5 into output circuit 3, current that would otherwise be used to build up the peak value of VOUT. Also, the operation of clock signal CLK1 can cause further inefficiencies within the circuitry of output circuit 3 due to the charging and discharging of capacitor C10, a component that is not even necessary in the eight-stage configuration.

DETAILED DESCRIPTION OF THE INVENTION

Various embodiments of the invention provide for reducing leakage current and reducing other inefficiencies in a reconfigurable charge pump circuit.

Figure 3:
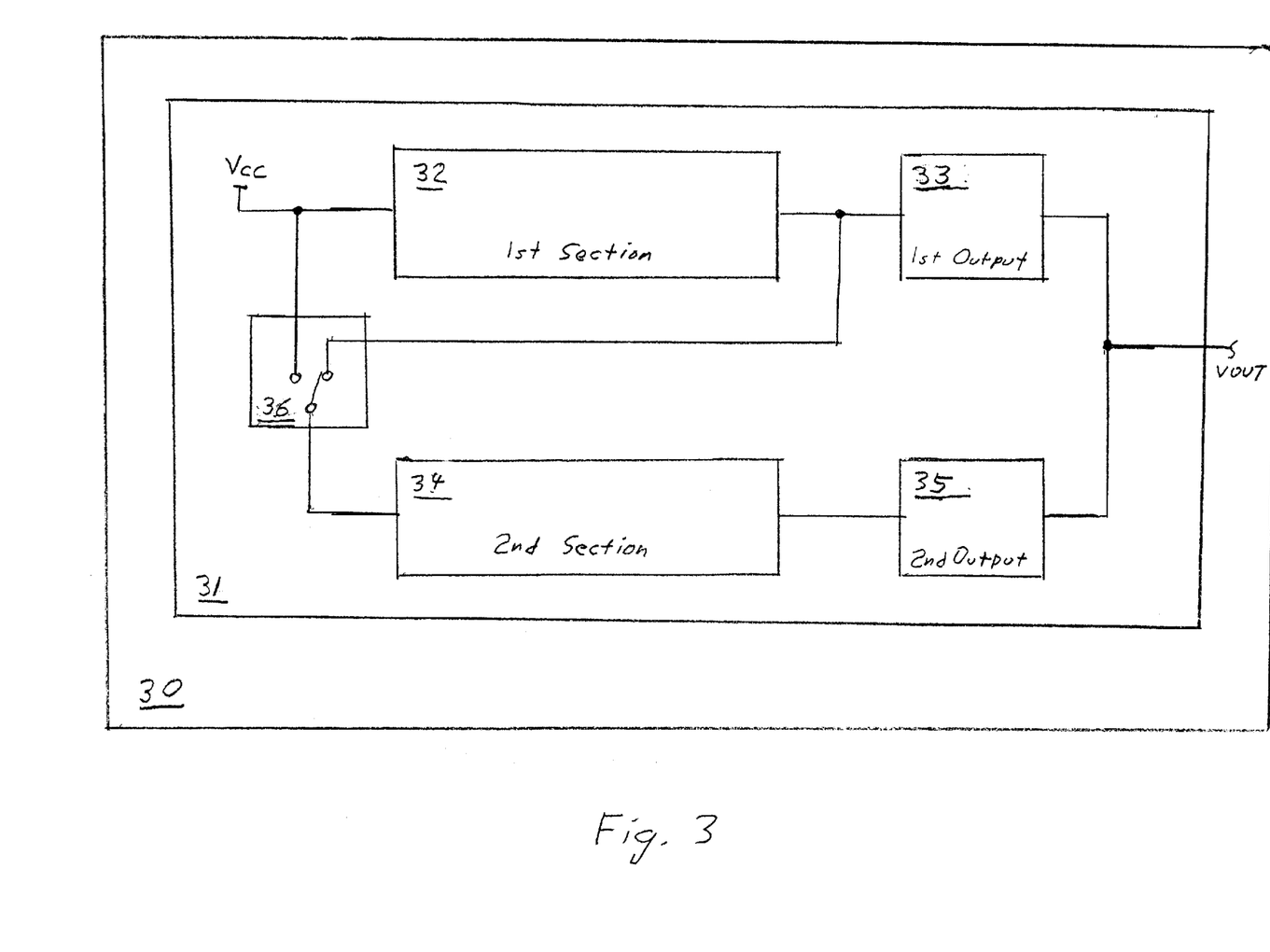
FIG. 3 shows a block diagram of a device with an improved reconfigurable charge pump circuit.

FIG. 3 shows a block diagram of a device 30 containing a reconfigurable charge pump circuit 31. In one embodiment, device 30 is a flash memory, and the output VOUT of the charge pump circuit 31 can be used to supply the voltage for the erase or programming functions, which typically require a much higher voltage than the remaining flash memory circuits. Reconfigurable charge pump circuit 31 is shown with a first charge pump section 32, a first output circuit 33, a second charge pump section 34, a second output circuit 35, and a switch circuit 36, which can correspond functionally to the FIG. 1 circuits 2, 3, 4, 5 and 6, respectively. However, the internal design of some of these circuits can be different from those of the prior art.

Figure 4:
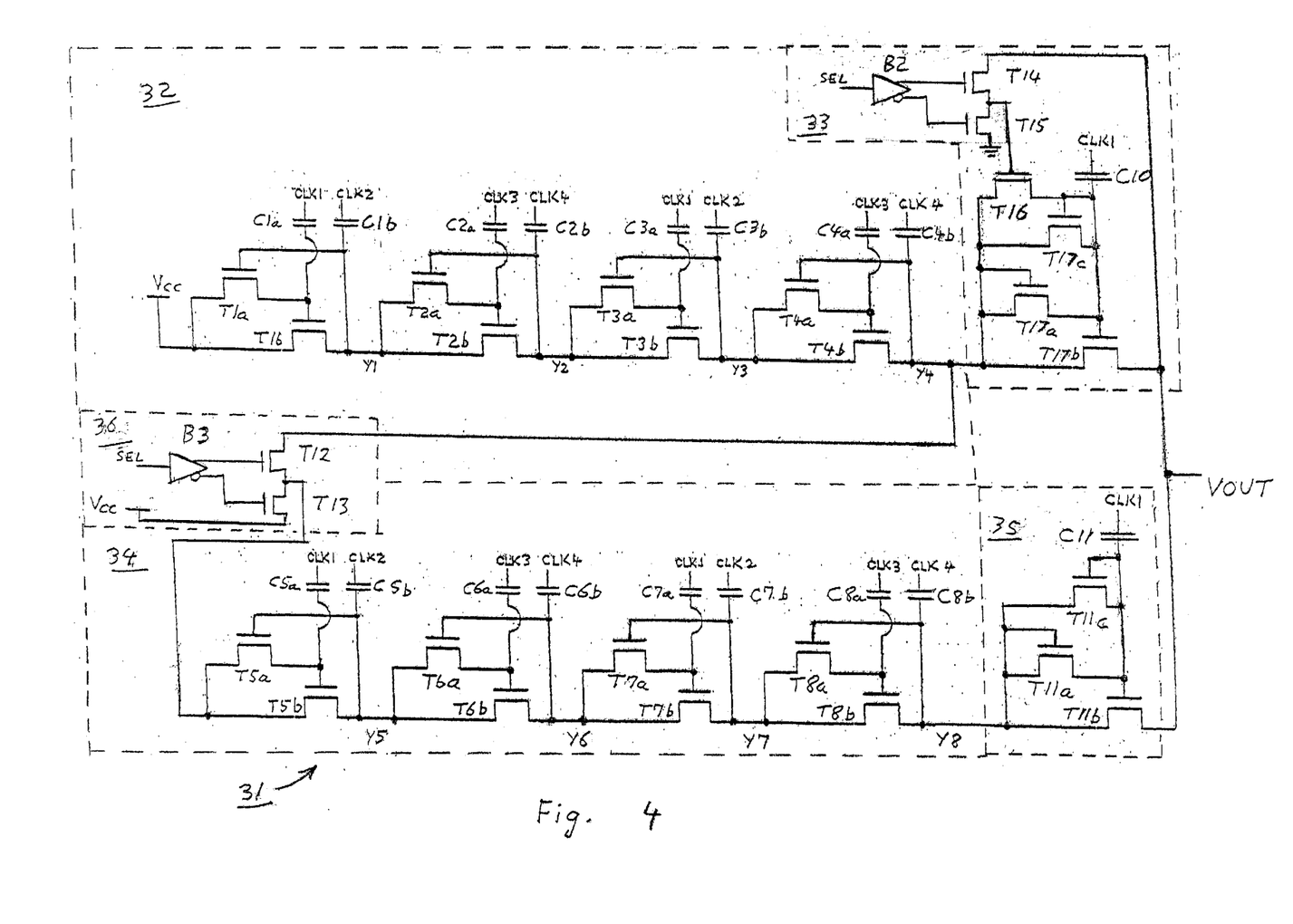
FIG. 4 shows a reconfigurable charge pump circuit of one embodiment.

FIG. 4 shows a circuit 31 of one embodiment, illustrating some circuit details of charge pump circuit 31. Although the figure shows eight stages, divided into two four-stage sections, other quantities of stages can also be used without departing from the spirit of the invention. Each stage is shown as containing two transistors Txa and Txb, and two capacitors Cxa and Cxb, but other designs for charge pump stages are known and can be used without departing from the spirit of the invention.

When compared with the conventional circuit of FIG. 1, output circuit 33 can include an additional transistor T16, which is shown connected between Y4 and the circuit junction containing the gate of transistor T17b. The gate of transistor T16 can be controlled by a level shifter in the form of transistors T14 and T15, which are in turn controlled by two-output buffer B2 to selectably place either of two voltage levels on the gate of T16. In one embodiment, these two voltage levels are VOUT and ground. When selector signal SEL is low, T14 is off and T15 is on, which connects the gate of T16 to ground. This turns off transistor T16, so that it has no appreciable effect on transistors T17a, b, and c. In this configuration, output circuit 33 can perform in the same manner as output circuit 3 of FIG. 1. However, if selector signal SEL is high, T15 is off and T14 is on, which connects the gate of T16 to VOUT. This turns on transistor T16, connecting Y4 to the gate of T17b, causing output circuit 33 to be operable as a diode circuit regardless of the state of clock signal CLK1. In this state, transistors T17a, b, and c perform as a diode that can pass current from Y4 to VOUT, but not in the reverse direction. Thus the higher voltage at VOUT can be blocked from passing current back to the lower voltage at Y4. This not only increases the efficiency of the overall current flow, but also permits voltage VOUT to be higher than it would be in a conventional circuit, since the voltage buildup from Y8 at VOUT when CLK1 is high is not compromised by draining some of the current back to Y4.

Figure 5:
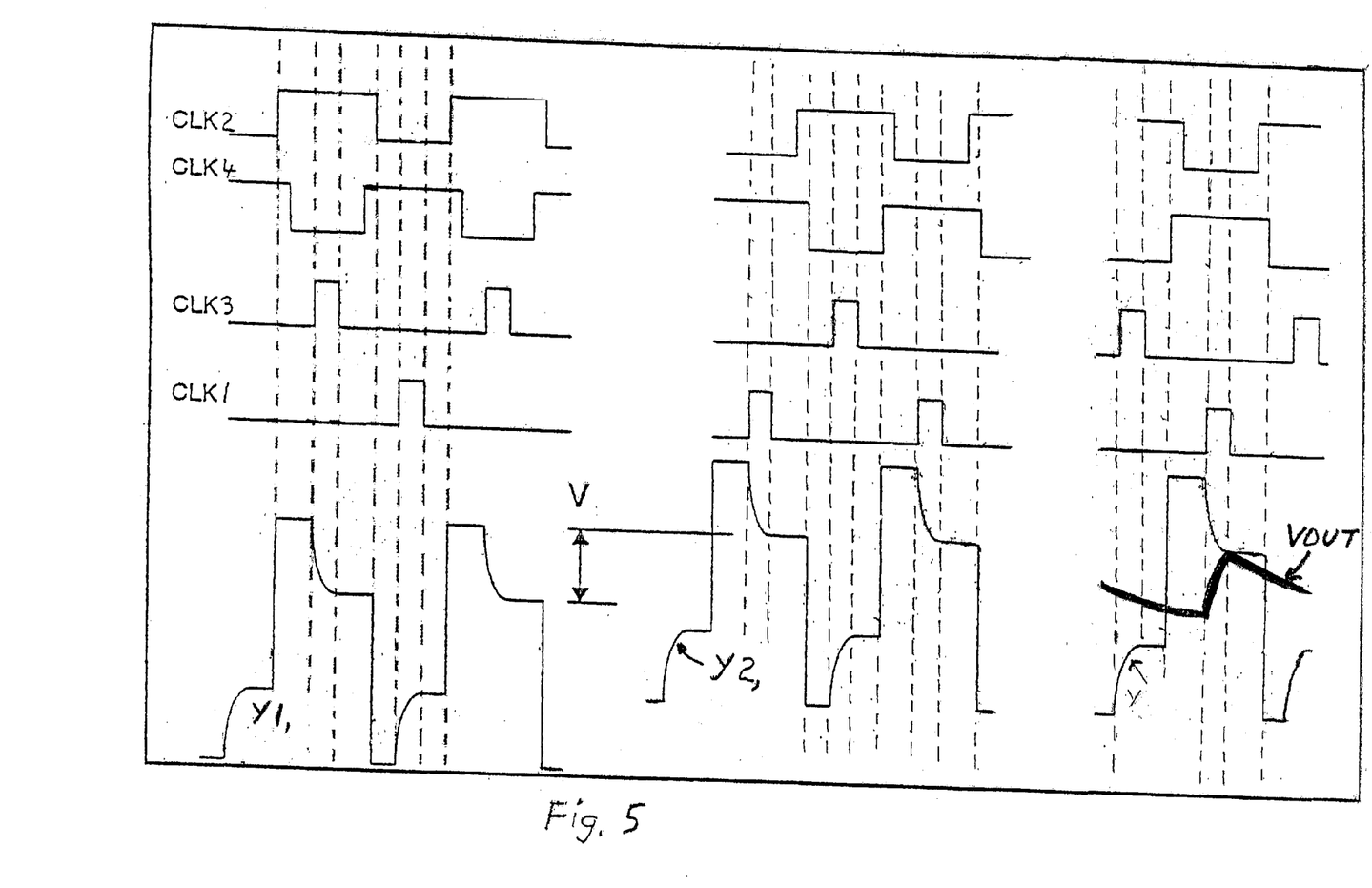
FIG. 5 shows a signal diagram for the circuit of FIG. 4.

The following provides a more detailed description of the operation of charge pump circuit 31 of FIG. 4, with reference to the associated waveforms shown in FIG. 5. FIG. 5 represents the waveforms when the circuit is at equilibrium. As with all charge pump circuits, when the clocks are initially started, it can take some time for the voltage levels at each stage to build up and the charge pump circuit to reach equilibrium.

The first and second stages of the charge pump are described here, to illustrate the operation of the overall charge pump circuit of FIG. 4. The other stages operate in a similar manner, as is evident to persons of ordinary skill in the art. The first stage of the illustrated embodiment can consist of transistors T1a and T1b, capacitors C1a and C1b, can produce output voltage Y1, and be fed by input Vcc, clock signal CLK1, and clock signal CLK2. The second stage can consist of transistors T2a and T2b, capacitors C2a and C2b, can produce output voltage Y2, and be fed by input Y1, clock signal CLK3, and clock signal CLK4.

When CLK1 goes from low to high, as shown in FIG. 5, the voltage level on both sides of capacitor C1a also increase by an equivalent amount. This can cause the gate of transistor T1b to go high, turning on transistor T1b. This can allow current to flow from Vcc through T1b to Y1, allowing the voltage at Y1 to ramp up as capacitor C1b is charged by this influx of current. This is illustrated by the Y1 waveform in FIG. 5 directly below the CLK1 pulse. When CLK1 goes low, the voltage on both sides of capacitor C1a also decrease by an equivalent amount. This can cause the gate of transistor T1b to go low, turning off transistor T1b and preventing any further flow of current through T1b in either direction. Shortly afterwards, CLK2 goes high, causing the voltage on both sides of capacitor C1b to increase by an equivalent amount, which in one embodiment is equivalent to the difference between Vcc and ground. This can raise voltage Y1 to its peak, as shown in FIG. 5. Subsequently, when CLK3 goes high, which increases the voltage at the gate of transistor T2b, T2b is turned on and the high voltage at Y1 causes current to flow through transistor T2b to Y2, allowing the voltage at Y2 to ramp up as capacitor C2b is charged by this influx of current. This is illustrated by the Y2 waveform in FIG. 5 directly below the CLK3 pulse. When CLK3 goes low, driving the gate of transistor T2b low, this can turn off transistor T2b and prevent any further flow of current through T2b in either direction. Shortly afterwards CLK4 goes high, causing the voltage on both sides of capacitor C2b to increase by the same amount, which in one embodiment is equivalent to the difference between Vcc and ground. This raises voltage Y2 to its peak.

Returning to the first stage, when CLK2 goes low, both sides of capacitor C1b go low, causing the voltage at Y1 to drop as shown. This can cause the voltage at Y1 to be lower than the voltage at Y2, but current cannot flow from Y2 to Y1 because transistor T2b is turned off at this point. Shortly afterwards, CLK1 goes high, turning on transistor T1b as before, and permitting current to flow from Vcc to the now-lower Y1. This starts another cycle of building up the output voltage Y1 of the first stage.

In the second stage, when CLK4 goes low, both sides of capacitor C2b go low, causing the voltage at Y2 to drop as shown. This can cause voltage Y2 to be lower than voltage Y1, which is now high, and when CLK3 goes high, current will flow from Y1 to Y2 through transistor T2b. As can be seen, although Y2 is lower than Y1 at this instant, the average voltage level at Y2 is greater than the average voltage level at Y1 by an amount V. This overall cycle at both the first stage and the second stage can repeat in the described manner, with the current flowing from the first stage to the second stage, but not in the reverse direction.

This process can be repeated at each stage, with the clock signals for any two adjacent stages being timed to cause current to flow from one stage to the next, and voltage levels to increase from one stage to the next. In one embodiment, the clock signals operate between Vcc and ground, and the amount of voltage level increase from one stage to the next can be approximately equal to this difference, minus the voltage drop that is incurred across transistor Txb. In one embodiment, Vcc is 1.8 volts and the voltage drop across transistor Txb is 0.3 volts, so that each stage can increase the average voltage level by 1.5 volts. In FIG. 4, this can produce an average voltage at Y4 of approximately 1.8+(4× 1.5)=7.8 volts. When the circuit is configured as an eight-stage charge pump circuit, this can produce an average voltage at Y8 of approximately 1.8+(8×1.5)=13.8 volts.

The configuration of the circuit of FIG. 4 can be controlled by switch circuit 36. Selection signal SEL can be applied to the input of dual-output buffer B3. When SEL is high, the non-inverted output of B3 to the gate of transistor T12 can be high, while the inverted output of B3 to the gate of T13 can be low. Conversely, when SEL is low, the non-inverted output of B3 to the gate of transistor T12 can be low, while the inverted output of B3 to the gate of T13 can be high. This permits transistors T12 and T13 to operate as a level-shifting switch. When SEL is high, T12 is turned on and voltage Y4 is connected to the input of the fifth stage, while T13 is turned off and Vcc is isolated from the input of the fifth stage. Conversely, when SEL is low, T13 is turned on and Vcc is connected to the input of the fifth stage, while T12 is turned off and Y4 is isolated from the input of the fifth stage. Thus, switch circuit 36 can configure the charge pump circuit as either a single eight-stage circuit, or as two four-stage circuits with each receiving Vcc as an input.

Although the described charge pump circuits can raise the average output voltage level to well beyond the supply voltage, FIG. 5 shows that the voltage waveform at any of these stages may be too erratic to be used as a power source for circuitry. Output circuit 35 can be operable as a voltage-smoothing output device to smooth this waveform to a more stable and usable form. When clock signal CLK1 goes high, the voltage levels of both sides of capacitor C11 can increase by an equivalent amount. This can cause the gate of transistor T11b to go high, turning on transistor T11b. This in turn can permit current to flow from Y8 to VOUT. As shown in the rightmost portion of FIG. 5, Y8 may be at its peak at this time. As current drains from the output of the eighth stage, the voltage level at Y8 can decrease while voltage level at VOUT can increase. When CLK1 goes low, transistor T11b is turned off, preventing further current flow through T11b in either direction. VOUT can then begin dropping as output current flows into whatever load has been connected to VOUT. The next occurrence of CLK1 again raises VOUT and repeats the cycle. Although VOUT swings between a high and low point, this swing can be much less pronounced than that of Y8. If VOUT is still too erratic for the chosen application, it can be further smoothed out by any known method for stabilizing power supply levels. Such methods are well known and are not described herein to avoid obscuring the invention.

Output circuit 33 can be coupled to the output of the first section, i.e., the first four stages, of charge pump circuit 31. Select signal SEL can be connected to the input of dual-output buffer B2. As with previously described buffer B3, the non-inverted output of B2 can be connected to the gate of transistor T14, while the inverted output of B2 can be connected to the gate of transistor T15. In one embodiment, B2 and B3 can be separate buffers. In another embodiment, the functions of B2 and B3 can be performed by a single buffer, with the non-inverted output connected to T12 and T14, and the inverted output connected to T13 and T15.

When SEL is low, transistor T14 can be turned off and transistor T15 turned on, connecting the gate of transistor T16 to ground. With transistor T16 turned off in this manner, it may have no effect on transistors T17a, b, and c, which can operate as their equivalent transistors T11a, b, and c in output circuit 35. In this configuration, output circuit 33 can operate in the same manner as output circuit 35. Since SEL is low, the output of the fourth stage can also be isolated from the input of the fifth stage by transistor T12, and Vcc connected to the input of the fifth stage by transistor T13. This creates two sections of parallel four-stage charge pump circuits, one with stages 1–4 and the other with stages 5–8. The outputs of both four-stage circuits can be connected to VOUT through their respective output circuits 33 and 35.

In this configuration, both sections are receiving the same input voltage Vcc, and are increasing that voltage with duplicate circuits to produce approximately the same voltages at Y4 and Y8. Y4 and Y8 are in turn being regulated in the same manner before being placed at VOUT. Since both output circuits 33 and 35 are producing approximately the same amount of current and voltage, with the same waveforms, the effective output at VOUT can be approximately the same voltage output as with a single four-stage charge pump circuit, but with approximately twice the current capacity.

Reconfiguring the charge pump circuit into a single eight-stage circuit can be accomplished by changing the select signal SEL to high. Within switch circuit 36, this can turn off transistor T13 and turn on transistor T12, coupling the fourth stage output Y4 to the input of the fifth stage, while isolating Vcc from the input of the fifth stage. This can permit the relative high voltage at Y4 to be used as the input for the fifth stage, so that subsequent voltage increases by stages 5–8 will increase it even further.

Within output circuit 33, changing select signal SEL to high can turn off transistor T15 and turn on transistor T14, which couples VOUT to the gate of transistor T16 and isolates the ground connection from this gate. Placing this relatively high voltage (VOUT) on the gate of transistor T16 turns on T16, which effectively connects the gate of transistor T17b to Y4. This can effectively make output circuit 33 operable as a diode circuit. If the voltage level at Y4 were greater than the voltage level at VOUT, the diode would be forward biased and would permit current to flow from Y4 to VOUT. However, in the eight-stage configuration, the voltage level at VOUT may be greater than the voltage level at Y4. This causes the diode circuit to be reverse-biased, and no current (other than possibly a small amount of leakage current) is permitted to flow from VOUT to Y4. Current can pass from Y8 through output switch 35 to charge up VOUT to a voltage level that is approximately at the mid-point of the Y8 waveform (see FIG. 5). This voltage level can be significantly higher than the voltage level at Y4, which reverse-biases the diode circuit formed by transistors T16 and T17a, b, and c, thereby preventing current from flowing in the reverse direction. In this manner, output circuit 33 does not drain significant current away from VOUT when the voltage at Y8 is higher that the voltage at Y4, thus improving the efficiency of the charge pump circuit when configured as a single eight-stage circuit. At the same time, output circuit 33 permits the charge pump circuit to be reconfigured as two parallel four-stage circuits.

Figure 6:
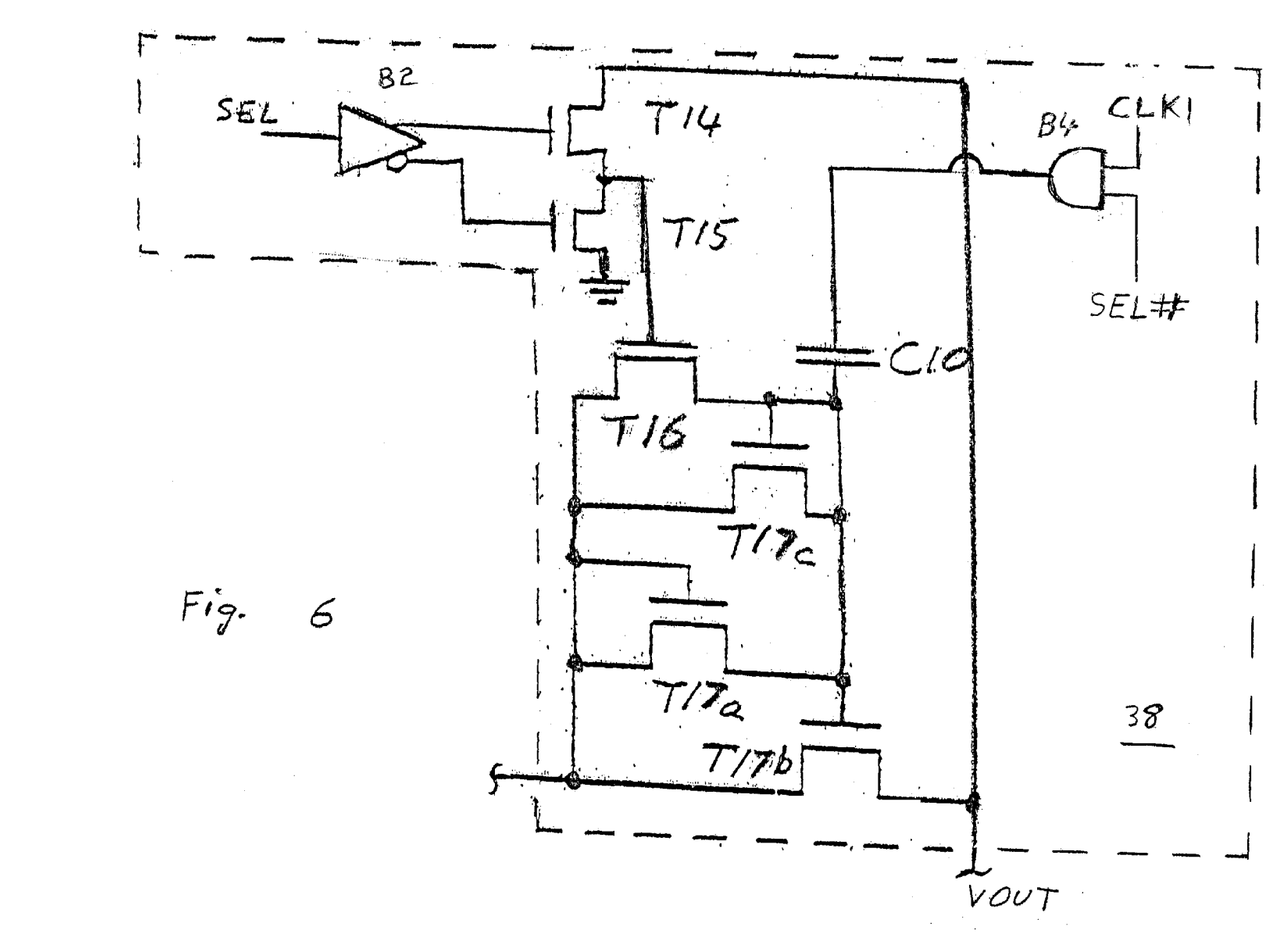
FIG. 6 shows an improved output switch.

When the charge pump circuit is in the aforementioned eight-stage configuration, clock signal CLK1 may not be needed in output circuit 33. Further, the propagation of CLK1 through capacitor C10 may cause perturbations in circuit operation by feeding through transistor T16 to affect the signal at Y4. FIG. 6 shows an output circuit 38 that can be used in place of output circuit 33 to turn off the offending CLK1 signal to this circuit. In output circuit 38, components B2, C10, T14, T15, T16, and T17a–c can be connected to each other in the same manner as in output circuit 33. However, the signal CLK1 can be coupled to capacitor C10 through AND gate B4, instead of being directly connected. When select signal SEL# (inverted version of SEL) is high, indicating dual four-stage charge pump circuits, CLK1 is passed through AND gate B4 so the clock signal reaches capacitor C10 as in previously described embodiments. When select signal SEL# is low, indicating an eight-stage configuration, the output of AND gate B4 is low regardless of the state of CLK1, preventing any clock signal from reaching capacitor C10. This can prevent capacitor C10 from being unnecessarily charged and discharged, and can further prevent the CLK1 signal from feeding back to Y4.

Although the aforementioned description and drawings are applied to an eight-stage circuit that is reconfigurable into two four-stage sections, other quantities of stages and other quantities of sections can be implemented in the same manner without departing from the spirit of the invention. For example, an eighteen-stage charge pump circuit can have output switches after the sixth, twelfth, and eighteenth stages, permitting three parallel sections. Outputs from some of the output switches, but not others, can be combined into a single output similar to VOUT.

Although specific combinations of components have been described herein as charge pump stages and as output switches, obvious variations in the selection of components and their combinations may be made without departing from the spirit or scope of the invention.

Figure 7:
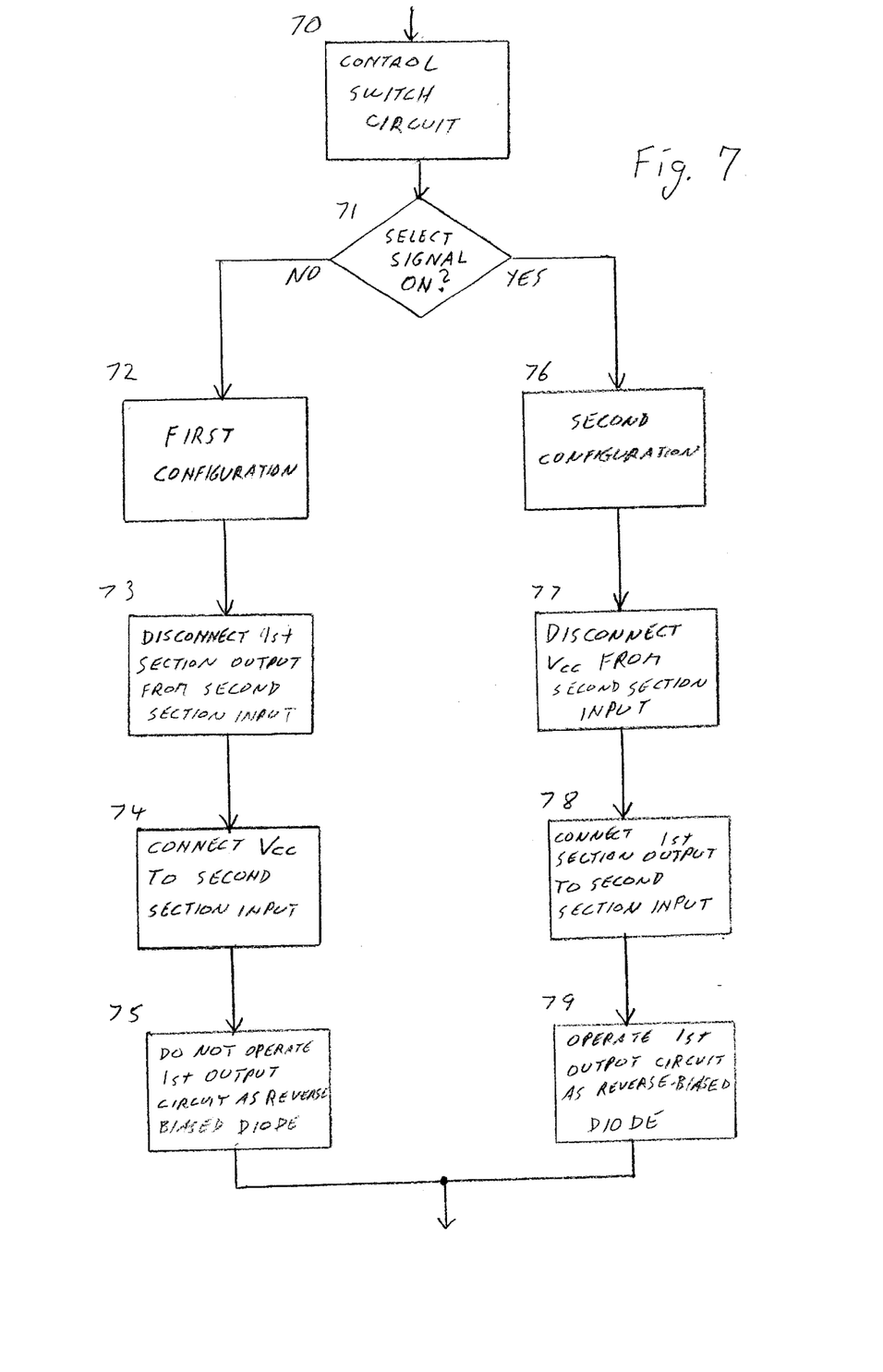
FIG. 7 shows a method of one embodiment.

FIG. 7 shows a method of one embodiment, in which reference is made to the description of FIG. 3 for the underlying functions and terminology. A switch circuit can be controlled at step 70 by the state of a select signal. Depending on the state of this select signal at step 71, the switch circuit can place a reconfigurable charge pump circuit in a first configuration at step 72 or a second configuration at step 76. In the first configuration, the output of the first charge pump section can be disconnected from the input of the second charge pump section at step 73, while Vcc can be connected to the input of the second section at step 74. In this configuration, the first output circuit is not operated as a reverse-biased diode at step 75, but may mimic the operation of the second output circuit.

In the second configuration, Vcc can be disconnected from the input of the second charge pump section at step 77, while the output of the first charge pump section can be connected to the input of the second charge pump section at step 78. In this configuration, the first output circuit is operated as a reverse-biased diode at step 79, effectively preventing current from flowing from VOUT back to the output of the first section.

The foregoing description is intended to be illustrative and not limiting. Variations will occur to those of skill in the art. Those variations are intended to be included in the invention, which is limited only by the spirit and scope of the appended claims.

I claim:

1. An apparatus, comprising:
   a reconfigurable charge pump circuit including a first section and a second section, and having a first configuration in which the first section and the second section are coupled in parallel to form parallel charge pump circuits, and having a second configuration in which the first section and the second section are coupled serially to form a single charge pump circuit; and
   a first output circuit having an input coupled to an output of the first section, and a second output circuit having an input coupled to an output of the second section, the second output circuit further having an output coupled to an output of the first output circuit;
   wherein the first output circuit is operable as a voltage-smoothing output device for the first section when the reconfigurable charge pump circuit is in the first configuration and is operable as a diode circuit when the reconfigurable charge pump circuit is in the second configuration.

2. The apparatus of claim 1, wherein:
   the first section comprises a first plurality of serially connected charge pump cells, and the second section comprises a second plurality of serially connected charge pump cells.

3. The apparatus of claim 1, wherein:
   the diode circuit is operable to block current from the output of the first output circuit to the input of the first output circuit in the second configuration.

4. The apparatus of claim 3, wherein:
   the first output circuit is operable to pass current from the input of the first output circuit to the output of the first output circuit during a clock pulse in the first configuration; and
   the first output circuit is further operable to block current between the input of the first output circuit and the output of the first output circuit other than during the clock pulse in the first configuration.

5. The apparatus of claim 3, wherein the clock pulse is blocked in the second configuration.

6. The apparatus of claim 1, wherein:
   the input of the second section is switchably coupled to the output of the first section through a switch circuit.

7. The apparatus of claim 1, wherein:
   the input of the second section is switchably coupled to a supply voltage through a switch circuit.

8. The apparatus of claim 1, wherein:
   the first output circuit includes a clock input to receive a clock signal.

9. The apparatus of claim 8, wherein:
   the first output circuit includes a selection circuit to disable the clock signal within the first output circuit in the second configuration.

10. The apparatus of claim 1, wherein:
    the diode circuit is to prevent current flow from the output of the first output circuit to the input of the first output circuit in the second configuration.

11. A system, comprising:
    a flash memory device comprising:
      a reconfigurable charge pump circuit including a first section and a second section, and having a first configuration in which the first section and the second section are coupled in parallel to form parallel charge pump circuits, and having a second configuration in which the first section and the second section are coupled serially to form a single charge pump circuit;
      a first output circuit having an input coupled to an output of the first section; and
      a second output circuit having an input coupled to an output of the second section, and having an output coupled to an output of the first output circuit;
      wherein the first output circuit is operable as a voltage-smoothing output device when the reconfigurable charge pump circuit is in the first configuration and is operable as a diode circuit when the reconfigurable charge pump circuit is in the second configuration.

12. The system of claim 11, wherein:
    the first section comprises a first plurality of serially connected charge pump cells, and the second section comprises a second plurality of serially connected charge pump cells.

13. The system of claim 11, wherein:
    the diode circuit is operable to block current from the output of the first output circuit to the input of the first output circuit in the second configuration.

14. The system of claim 13, wherein:
    the first output circuit is operable to pass current from the input of the first output circuit to the output of the first output circuit during a clock pulse in the first configuration; and
    the first output circuit is further operable to block current between the input of the first output circuit and the output of the first output circuit other than during the clock pulse in the first configuration.

15. The system of claim 13, wherein the clock pulse is blocked in the second configuration.

16. The system of claim 11, wherein:
    the input of the second section is switchably coupled to the output of the first section through a switch circuit.

17. The system of claim 11, wherein:
the input of the second section is switchably coupled to a supply voltage through a switch circuit.

18. The system of claim 11, wherein:
the first output circuit includes a clock input to receive a clock signal.

19. The system of claim 18, wherein:
the first output circuit includes a selection circuit to disable the clock signal within the first output circuit in the second configuration.

20. The system of claim 11, wherein:
the diode circuit is to prevent current flow from the output of the first output circuit to the input of the first output circuit in the second configuration.

21. A method, comprising:

switching a charge pump circuit between first and second configurations, the first configuration providing a first charge pump section coupled in parallel with a second charge pump section, the second configuration providing the first charge pump section coupled in series with the second charge pump section;

providing a first output circuit coupled to an output of the first charge pump section, providing a second output circuit coupled to an output of the second charge pump section and coupled to the first output circuit; and operating the first output circuit in the second configuration as a reverse-biased diode circuit between an output of the first output circuit and an input of the first output circuit.

22. The method of claim 21, further comprising:

operating the first output circuit in the first configuration to not create a reverse-biased diode circuit between the output of the first output circuit and the input of the first output circuit.

23. The method of claim 21, further comprising:

providing a switching circuit coupled between the output of the first charge pump section and an input of the second charge pump section to switch between the first and second configurations;

wherein operating the first output circuit in the first and second configurations includes controlling the first output circuit with the switching circuit.

* * * * *

UNITED STATES PATENT AND TRADEMARK OFFICE
CERTIFICATE OF CORRECTION

PATENT NO.     : 6,369,642 B1
DATED          : April 9, 2002
INVENTOR(S)    : Zeng It is certified that error appears in the above-identified patent and that said Letters Patent is hereby corrected as shown below:

<u>Column 1,</u>
Line 55, after "Output circuit", insert -- 5 --.

Signed and Sealed this

Third Day of December, 2002

JAMES E. ROGAN
*Director of the United States Patent and Trademark Office*